Patented Nov. 6, 1945

2,388,499

UNITED STATES PATENT OFFICE 2,388,499

RECOVERING PURE BETA-PICOLINE

George Riethof, Mount Lebanon, Pa., assignor to Pittsburgh Coke & Iron Company, Pittsburgh, Pa., a corporation of Pennsylvania No Drawing. Application May 12, 1942, Serial No. 442,725

10 Claims. (Cl. 260—290)

This invention relates to the recovery of pure beta-picoline; and it is particularly concerned with a method of recovering beta-picoline substantially free from gamma-picoline and other basic oils, from mixtures of basic oils containing beta- and gamma-picoline, said process comprising heating said mixture of basic oils with cyclic aldehyde in the presence of acetic anhydride until the basic oils other than beta-picoline have condensed with said aldehyde leaving the beta-picoline unchanged, and separating said condensation products from the uncombined beta-picoline; and it further comprises a process wherein the basic oil mixture is preliminarily treated to effect removal of 2,6-lutidine by reacting the 2,6-lutidine with urea and separating the reaction product from the basic oil mixture, whereby substantial economy of aldehyde may be effected in the subsequent recovery of beta-picoline; all as more fully hereinafter set forth and as claimed.

One of the principal natural sources of beta-picoline is the basic coal tar oils in which it occurs in admixture with its isomers, alpha- and gamma-picoline, and its homologues, the lutidines. These basic oils can be fractionated to produce cuts rich in beta-picoline, but it is not practicable by simple distillation to separate beta-picoline from gamma-picoline and from 2,6-lutidine because all three of these basic oils boil at about 142° C. The product sold commercially as technical beta-picoline often contains fifty per cent or more of other basic oils, being perhaps seventy per cent beta- and gamma-picoline and the remainder mainly 2,6-lutidine.

Pure beta-picoline is not available commercially although beta-picoline of sufficient purity to produce, on oxidation, nicotinic acid having a melting point of about 232° C., is in demand for the production of nicotinic acid and nicotinic acid compounds for fortifying the vitamin content of foods. The specification of the melting point of the nicotinic acid formed on oxidation of beta-picoline is a valuable and accurate measure of the quality of beta-picoline, because it has been found that gamma-picoline, when present even in very small amounts in the beta-picoline, will depress the melting point of the oxidation product to 215° C., or less. Thus, by selection of beta-picoline, which on oxidation yields nicotinic acid having a melting point of 232° C. or higher, a material of high purity, and particularly a material substantially completely free of gamma-picoline, is assured.

It is an object achieved by the present invention to provide a process whereby beta-picoline of such purity that on oxidation it will produce nicotinic acid having a melting point above about 232° C., and as high as 235° to 237° C. may be recovered from mixtures of beta-picoline with other basic coal tar oils, particularly gamma-picoline and 2,6-lutidine. By the term "pure beta-picoline," as used herein and in the appended claims, I mean beta-picoline which on oxidation yields nicotinic acid having a melting point of at least 232° C.

The reaction between a picoline in which the methyl group is in the alpha or gamma position with a cyclic aldehyde in the presence of a dehydrating agent such as acetic anhydride normally does not proceed to completion but reaches equilibrium at a point at which a relatively large percentage of the picoline remains unreacted or uncombined. I have discovered, however, that when this reaction is carried out in the presence of a tertiary amine which does not react with aldehydes, the amine acts to catalyze the reaction so that it proceeds to completion and all or substantially all of the alpha- or gamma-picoline present is converted to an aldehyde condensation product. By application of this discovery to the treatment of basic coal tar oils, I have found that pure beta-picoline can be recovered from such oils containing beta-picoline in admixture with alpha- or gamma-picoline or both and with 2,6-lutidine.

I have found that on heating a mixture of basic coal tar oils containing beta-picoline, particularly a mixture of beta-picoline with gamma-picoline or 2,6-lutidine, or both, with a cyclic aldehyde such as benzaldehyde or furfural in the presence of acetic anhydride, the beta-picoline, a tertiary amine which does not react with aldehydes, acts as a catalyst, and a reaction can be effected between the aldehyde and all of the gamma-picoline as well as with substantially all of the 2,6-lutidine to form compounds such as stilbazoles or styryl pyridines or corresponding furyl compounds, while the beta-picoline remains unchanged. The beta-picoline is readily separable from these reaction products by distillation or by extraction of the reaction mass with water. By this process, substantially complete separation of the beta-picoline from gamma-picoline and 2,6-lutidine can be effected and the beta-picoline recovered is of sufficiently high purity to produce on oxidation nicotinic acid having a melting point above about 232° C., usually between about 235° and 237° C.

In carrying out the process of my invention when beta-picoline is to be recovered from a mixture of basic tar oils containing relatively large amounts of 2,6-lutidine, it is often desirable to effect a preliminary separation of 2,6-lutidine. While my process is effective to recover pure beta-picoline from admixture with 2,6-lutidine, it is sometimes more economical to effect a preliminary separation of some of the 2,6-lutidine. Also, a pure beta-picoline can be recovered in somewhat better yield by my process from a mixture containing a relatively small amount of 2,6-lutidine than from one containing a relatively large amount.

Such preliminary separation of 2,6-lutidine can be effected by the process of my copending United States patent application Serial No. 404,932, filed July 31, 1941. The method therein described comprises treating a mixture of basic tar oils containing 2,6-lutidine with urea. The urea reacts with the 2,6-lutidine to form a crystalline compound which separates out of the solution. A mixture of beta- and gamma-picoline thus separated from 2,6-lutidine may advantageously be treated according to the present invention for the recovery of pure beta-picoline.

The process of my invention is usually carried out by mixing the crude basic oil mixture containing the beta-picoline to be recovered, with an amount of acetic anhydride and cyclic aldehyde, each equal to or slightly greater than the theoretical amount required to combine with all of the gamma-picoline and 2,6-lutidine present in the crude basic oil mixture. Somewhat smaller amounts of aldehyde may be used if desired, but I have found that in such case there is a tendency for the combination of two mols of gamma-picoline with one mol of aldehyde and the production of compounds which require more careful fractionation for their separation from the beta-picoline. The aldehydes which I have found most advantageous for my process are furfural and benzaldehyde.

The mixture of basic oils, acetic anhydride and aldehyde is heated at a temperature between 130° and 180° C., advantageously between 140° and 160° C., for a time sufficient to effect substantially complete reaction between the gamma-picoline and 2,6-lutidine present, with the aldehyde. For this purpose I have found heating at a temperature of about 150° C. for about five hours is usually adequate. The reaction is exothermic and after the reaction mixture has been raised to a temperature near 150° C. little heat input is required to maintain the desired temperature until towards the end of the reaction when it is sometimes desirable to raise the temperature, for example to 160° C., to speed up the reaction and cut down the reaction time.

As the reaction proceeds a black oil is formed containing unchanged beta-picoline and the reaction products which are high boiling, and excess reagents. Upon fractional distillation of this oil, beta-picoline mixed with acetic acid can be separated. This mixture is treated with sulfuric acid to convert the beta-picoline to its acid sulfate and the acetic acid is distilled off. The remaining beta-picoline acid sulfate, upon neutralization, for example with caustic soda and redistillation and drying yields pure beta-picoline completely free of gamma-picoline and free or substantially free of 2,6-lutidine. The pure beta-picoline thus recovered sometimes contains a trace of the aldehyde reagent which can be readily removed by resinifying the aldehyde and again redistilling the beta-picoline. The presence of aldehyde in the recovered pure beta-picoline may be avoided by steam distillation of the beta-picoline acid sulfate prior to the neutralization and redistillation steps. The pure beta-picoline thus recovered upon oxidation yields nicotinic acid having a melting point above about 232° C., usually between 235° and 237° C.

Another method of recovering the beta-picoline is by steam distillation of the black oil. In carrying out the process in this manner the black oil, after cooling, is mixed with water and the mixture is steam distilled until the beta-picoline, acetic acid and excess aldehyde have been distilled off. The residual oil-water mixture is then allowed to stratify into an oil and an aqueous layer and cooled. The aqueous layer which contains some beta-picoline is then separated and mixed with the distillate and the whole mixture is acidified with sulfuric acid to convert the beta-picoline to the acid sulfate. The acetic acid and other impurities are distilled off and a solution of beta-picoline acid sulfate remains. This solution is then made alkaline, for example, with caustic soda and pure beta-picoline is distilled off and recovered. The pure beta-picoline thus recovered is completely free from gamma-picoline and free or substantially free of 2,6-lutidine, and upon oxidation yields nicotinic acid having a melting point above 232° C., usually between 235° and 237° C.

Not all the beta-picoline in the black oil goes over into the distillate on steam distillation. However, it can be separately recovered. The oil-water mixture in the still is stratified and cooled to room temperature. The two layers are separated.

The solid layer or solidified oil is a mixture of condensation products of the aldehyde with gamma-picoline and 2,6-lutidine; gamma-styryl-pyridine and 2,6-di-styryl-pyridine being obtained from the gamma-picoline and the 2,6-lutidine, respectively, when benzaldehyde is used. This mixture of styryl pyridines is a waxy crystalline material melting at approximately 95° C. and substantially insoluble in cold water. It is slightly soluble in hot water. It may be further purified by crystallization from hot water. These styryl pyridines are readily soluble in alcohol; both the waxy crystalline mixture and the recrystallized compounds.

The aqueous layer separated from the solidified oil contains appreciable amounts of beta-picoline dissolved therein and may be further processed with the distillate or separately, to recover an additional amount of beta-picoline. If desired it may also be put back in cycle in the process of treating further amounts of black oil.

The following examples illustrate the results obtainable by the method of my invention:

*Example 1.*—In this example pure beta-picoline was recovered from a mixture of basic tar oils containing about 40.0 per cent by weight of beta-picoline, 45 per cent by weight of gamma-picoline and 15 per cent by weight of 2,6-lutidine. This basic oil mixture was obtained by treating a crude commercial picoline cut with urea according to the process of my copending application Serial No. 404,932 to effect a preliminary separation of a part of the 2,6-lutidine.

To 300 parts by weight of the picoline mixture there were added 405 parts by weight of benzaldehyde and 450 parts by weight of acetic anhydride. The mixture was heated to 170° C. and maintained at 170° to 180° C. for four to five hours until the reaction was substantially complete. A black oil was obtained which was cooled to room temperature and added to about 1.5 liters of water. The mixture was agitated at room temperature for a time sufficient to extract most of the beta-picoline and water soluble impurities from the oil. The stirring was stopped and the mixture stratified into an oil layer and an aqueous layer. These layers were separated.

The aqueous layer was acidified with 100 cc. of concentrated sulfuric acid to convert the beta-picoline to its acid sulfate. The solution was then distilled to remove acetic acid which was condensed and recovered. The remaining solution was cooled to room temperature and made alkaline with caustic soda. The alkaline solution was distilled to recover pure beta-picoline.

A sample of the beta-picoline thus recovered was oxidized to nicotinic acid by the method described by Pinner in Berichte 33, 1226 (1900) with the exception that the nicotinic acid was not purified but was tested in the form in which it crystallized from the aqueous solution. The resulting nicotinic acid had a melting point of 232° C.

*Example 2.*—In this example pure beta-picoline was recovered from a crude picoline cut of basic tar oils containing about 35 per cent by weight beta-picoline, 40 per cent by weight of gamma-picoline, and 25 per cent by weight of 2,6-lutidine.

To 1500 parts by weight of the crude picoline cut, 1500 parts by weight of acetic anhydride and 1230 parts by weight of furfural were added. This represents an excess of both reagents over the theoretical amount required to react with all of the gamma-picoline and 2,6-lutidine present. The mixture was heated to a temperature of 152° C. and heating was continued for five hours. The reaction mixture was then distilled off to 160° C. To the distillate 450 cc. of concentrated sulfuric acid were added to form beta-picoline acid sulfate and the mixture was distilled to separate acetic acid. The remaining solution of beta-picoline acid sulfate was neutralized with caustic soda and the pure beta-picoline was distilled off.

A sample of the beta-picoline thus recovered was oxidized to nicotinic acid by the modified method of Pinner above referred to in Example 1. The resulting nicotinic acid had a melting point 236.8–237.2° C.

It will be noted that the reactions according to the present invention are carried out in substantially less time than is usually the case in reactions of this general character which require at least ten hours or more to complete the reactions as evidenced in such publications as: Maier "Das Pyridin und Seiner Derivatives," pages 35, 54 and 59 (1934); Berichte 24, pages 1676–8; Journal Chemical Society (1933), pages 77–79; Berichte 21, pages 1007–10; Maier "Das Pyridine," page 257 (1934).; and Berichte, vol. 32, pages 1889 and 2526–7.

This application is a continuation-in-part of my copending United States Patent application Serial No. 404,933, filed July 31, 1941.

While my invention has been defined herein with respect to certain specific embodiments thereof, it is to be understood that the invention is not limited to the details of such specific embodiments except as hereinafter defined in the appended claims.

What I claim is:

1. A process of recovering pure beta-picoline from basic oil mixtures containing beta-picoline and appreciable amounts of gamma-picoline and 2,6-lutidine comprising combining the gamma-picoline and 2,6-lutidine with a cyclic aldehyde selected from the group consisting of aromatic aldehydes and furfural by heating the basic oil mixture with said cyclic aldehyde at a temperature of 130° to 180° C. in the presence of acetic anhydride, the reaction being substantially completed in a time substantially less than ten hours and thereafter separating unchanged beta-picoline from the reaction mixture.

2. A process of recovering pure beta-picoline from basic oil mixtures containing beta-picoline and appreciable amounts of gamma-picoline and 2,6-lutidine comprising combining the gamma-picoline and 2,6-lutidine with benzaldehyde by heating the basic oil mixture with said benzaldehyde at a temperature of 130° to 180° C. in the presence of acetic anhydride, the reaction being substantially completed in a time substantially less than ten hours and thereafter separating unchanged beta-picoline from the reaction mixture.

3. A process of recovering pure beta-picoline from basic oil mixtures containing beta-picoline and appreciable amounts of gamma-picoline and 2,6-lutidine comprising combining the gamma-picoline and 2,6-lutidine with furfural by heating the basic oil mixture with said furfural at a temperature of 130° to 180° C. in the presence of acetic anhydride, the reaction being substantially completed in a time substantially less than ten hours and thereafter separating unchanged beta-picoline from the reaction mixture.

4. A process of recovering pure beta-picoline from basic oil mixtures containing beta-picoline and appreciable amounts of gamma-picoline and 2,6-lutidine comprising combining the gamma-picoline and 2,6-lutidine with a cyclic aldehyde selected from the group consisting of aromatic aldehydes and furfural by heating the basic oil mixture with said cyclic aldehyde at a temperature of 130° to 180° C. in the presence of acetic anhydride, the reaction being substantially completed in a time substantially less than ten hours and thereafter distilling off unchanged beta-picoline from the reaction mixture.

5. A process of recovering pure beta-picoline from basic oil mixtures containing beta-picoline and appreciable amounts of gamma-picoline and 2,6-lutidine comprising combining the gamma-picoline and 2,6-lutidine with a cyclic aldehyde selected from the group consisting of aromatic aldehydes and furfural by heating the basic oil mixture with said cyclic aldehyde at a temperature of 130° to 180° C. in the presence of acetic anhydride, the reaction being substantially completed in a time substantially less than ten hours and thereafter extracting unchanged beta-picoline from the reaction mixture by treating with water.

6. A process of recovering pure beta-picoline from basic oil mixtures containing beta-picoline and appreciable amounts of gamma-picoline and 2,6-lutidine comprising combining the gamma-picoline and 2,6-lutidine with a cyclic aldehyde selected from the group consisting of aromatic aldehydes and furfural by heating the basic oil mixture with said cyclic aldehyde at a temperature of 140° to 160° C. in the presence of acetic anhydride, the reaction being substantially completed in a time substantially less than ten hours and thereafter separating unchanged beta-picoline from the reaction mixture.

7. A process of recovering pure beta-picoline from basic oil mixtures containing beta-picoline and appreciable amounts of gamma-picoline and 2,6-lutidine comprising combining the gamma-picoline and 2,6-lutidine with furfural by heating the basc oil mixture with furfural at a temperature of 140° to 160° C. in the presence of acetic anhydride, the reaction being substantially completed in a time substantially less than ten hours and thereafter separating unchanged beta-picoline from the reaction mixture.

8. A process of recovering pure beta-picoline from basic oil mixtures containing beta-picoline and appreciable amounts of gamma-picoline and 2,6-lutidine comprising combining the gamma-picoline and 2,6-lutidine with furfural by heating the basic oil mixture with furfural at a temperature of 140° to 160° C. in the presence of acetic anhydride, the reaction being substantially completed in a time substantially less than ten hours and thereafter distilling off the unchanged beta-picoline, treating the distillate with sufficient sulfuric acid to convert the beta-picoline to its acid sulfate, distilling off acetic acid and other impurities from the solution of beta-picoline acid sulfate, neutralizing the remaining solution with alkali and distilling off and recovering pure beta-picoline.

9. A process of recovering pure beta-picoline from basic oil mixtures containing beta-picoline and appreciable amounts of gamma-picoline and 2,6-lutidine comprising combining the gamma-picoline and 2,6-lutidine with furfural by heating the basic oil mixture with furfural at a temperature of 140° to 160° C. in the presence of acetic anhydride, the reaction being substantially completed in a time substantially less than ten hours and thereafter extracting the unchanged beta-picoline from the reaction products by treating with water, treating the extract with sufficient sulfuric acid to convert the beta-picoline to its acid sulfate, distilling off acetic acid and other impurities from the solution of beta-picoline acid sulfate, neutralizing the remaining solution with alkali and distilling off and recovering pure beta-picoline.

10. A process of recovering pure beta-picoline from basic oil mixtures containing beta-picoline and appreciable amounts of gamma-picoline and 2,6-lutidine comprising combining the gamma-picoline and 2,6-lutidine with a cyclic aldehyde selected from the group consisting of aromatic aldehydes and furfural by heating the basic oil mixture with said cyclic aldehyde in the presence of acetic anhydride at a temperature and for a time until the basic oils other than beta-picoline have substantially completely condensed with said aldehyde leaving the beta-picoline unchanged, the reaction being substantially completed in a time substantially less than ten hours and thereafter separating unchanged beta-picoline from the reaction mixture.

GEORGE RIETHOF.